US012566855B2

(12) United States Patent
Sugihara

(10) Patent No.: US 12,566,855 B2
(45) Date of Patent: Mar. 3, 2026

(54) SECURITY MEASURE METHOD AND SECURITY MEASURE SYSTEM

(71) Applicant: Panasonic Automotive Systems Co., Ltd., Kanagawa (JP)

(72) Inventor: Kenji Sugihara, Hyogo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 24 days.

(21) Appl. No.: 18/740,087

(22) Filed: Jun. 11, 2024

(65) Prior Publication Data

US 2024/0330464 A1     Oct. 3, 2024

Related U.S. Application Data

(63) Continuation of application No. PCT/JP2022/029536, filed on Aug. 1, 2022.

(30) Foreign Application Priority Data

Dec. 17, 2021     (JP) ................................. 2021-205291

(51) Int. Cl.
    *G06F 21/56*      (2013.01)
    *G06F 8/65*       (2018.01)
    *G06F 21/57*      (2013.01)

(52) U.S. Cl.
    CPC .............. *G06F 21/568* (2013.01); *G06F 8/66* (2013.01); *G06F 21/57* (2013.01)

(58) Field of Classification Search
    CPC .......... G06F 21/568; G06F 8/66; G06F 21/57; G06F 21/56; B60R 16/02
    See application file for complete search history.

(56) References Cited

U.S. PATENT DOCUMENTS 7,925,888 B1 *  4/2011  Nachenberg  .......... G06F 21/566
                            713/188
8,732,825 B2 *  5/2014  Park  ...................... G06F 21/562
                            726/22

(Continued)

FOREIGN PATENT DOCUMENTS

JP        H0633828 A  *  2/1994
JP       2011-523748     8/2011

(Continued)

OTHER PUBLICATIONS

International Search Report issued in International Patent Application No. PCT/JP2022/029536, dated Oct. 18, 2022, with English language translation.

*Primary Examiner* — Joseph P Hirl
*Assistant Examiner* — Aayush Aryal
(74) *Attorney, Agent, or Firm* — Greenblum & Bernstein, P.L.C.

(57) ABSTRACT

A security measure method for software executed by a vehicle is provided. The software is implemented by a plurality of first modules. The vehicle includes a ROM configured to store a plurality of second modules corresponding to the plurality of first modules. The vehicle checks whether or not there is an abnormality in each of the plurality of first modules, extracts, when an abnormal first module is detected, the abnormal first module from the software, reads the second module corresponding to the abnormal first module from the ROM, and rewrites the abnormal first module in the software to the second module read from the ROM.

8 Claims, 3 Drawing Sheets

(56)          References Cited

U.S. PATENT DOCUMENTS

| | | | | |
|---|---|---|---|---|
| 8,938,807 | B1 * | 1/2015 | Huang | G06F 21/56 |
| | | | | 726/23 |
| 9,767,318 | B1 * | 9/2017 | Dropps | G06F 21/72 |
| 10,549,760 | B2 * | 2/2020 | Rave | B60W 50/0205 |
| 11,677,786 | B1 * | 6/2023 | Vashisht | H04L 63/1433 |
| | | | | 726/22 |
| 2009/0077665 | A1 * | 3/2009 | Chang | H04L 63/1425 |
| | | | | 726/24 |
| 2009/0222910 | A1 * | 9/2009 | Le Bihan | H04L 9/3273 |
| | | | | 726/19 |
| 2009/0300761 | A1 | 12/2009 | Park et al. | |
| 2012/0304244 | A1 | 11/2012 | Xie et al. | |
| 2012/0317646 | A1 * | 12/2012 | Huang | G06F 21/561 |
| | | | | 726/24 |
| 2013/0152203 | A1 * | 6/2013 | Zhou | G06F 9/3885 |
| | | | | 726/24 |
| 2013/0312100 | A1 * | 11/2013 | Wang | G06F 21/562 |
| | | | | 726/24 |
| 2015/0319136 | A1 | 11/2015 | Xie et al. | |
| 2016/0098561 | A1 * | 4/2016 | Keller | G06F 21/566 |
| | | | | 726/24 |
| 2016/0357958 | A1 * | 12/2016 | Guidry | G06F 21/53 |
| 2019/0171818 | A1 * | 6/2019 | Nakai | H04W 12/125 |
| 2019/0251279 | A1 * | 8/2019 | Emberson | G06F 21/602 |
| 2020/0351281 | A1 * | 11/2020 | Ruvio | H04W 12/106 |
| 2021/0344700 | A1 * | 11/2021 | Ueno | H04L 12/40169 |
| 2022/0391541 | A1 * | 12/2022 | Novotny | G06F 21/57 |

FOREIGN PATENT DOCUMENTS

| | | |
|---|---|---|
| JP | 2014-519113 | 8/2014 |
| JP | 2020-119090 | 8/2020 |
| JP | 2021-060778 | 4/2021 |
| WO | 2018-065973 | 4/2018 |

* cited by examiner

SECURITY MEASURE METHOD AND SECURITY MEASURE SYSTEM

TECHNICAL FIELD

The present disclosure relates to a security measure method and a security measure system.

BACKGROUND ART

In recent years, a vehicle (for example, connected cars) is known that is capable of downloading and updating data and software for, for example, achieving driving assistance or autonomous driving through an external communication network. Such a vehicle may be subjected to a cyber attack using malware, viruses, or the like through the external communication network. When a cyber attack occurs, for example, software or data may be tampered with, an unauthorized control command may be executed, and the vehicle may malfunction. Therefore, the vehicle that can be connected to a communication network are required to have sufficient security measures (for example, see Patent Literature 1).

CITATION LIST

Patent Literature

Patent Literature 1: JP2020-119090A

SUMMARY OF INVENTION

In a security measure for a vehicle, it is required that the safety of traveling of the vehicle is sufficiently secured even if a virus invades the vehicle.

The object of the present disclosure is to provide a security measure method and a security measure system capable of sufficiently securing the safety of traveling of a vehicle even if a virus invades the vehicle.

A security measure method according to an aspect of the present disclosure is a security measure method for software executed by a vehicle. The software is implemented by a plurality of first modules. The vehicle includes a read only memory (ROM) configured to store a plurality of second modules corresponding to the plurality of first modules. The vehicle checks whether or not there is an abnormality in each of the plurality of first modules, extracts, when an abnormal first module is detected, the abnormal first module from the software, reads the second module corresponding to the abnormal first module from the ROM, and rewrites the abnormal first module in the software to the second module read from the ROM.

A security measure system according to an aspect of the present disclosure is a security measure system for taking a security measure on software executed by a vehicle. The security measure system includes a server, and the vehicle. The software is implemented by a plurality of first modules. The vehicle includes a ROM configured to store a plurality of second modules corresponding to the plurality of first modules. The vehicle checks whether or not there is an abnormality in each of the plurality of first modules, deletes, when an abnormal first module is detected, the abnormal first module from the software, reads the second module corresponding to the abnormal first module from the ROM, and rewrites the abnormal first module in the software to the second module read from the ROM.

These comprehensive or specific aspects may be implemented by a system, a device, a method, an integrated circuit, a computer program, or a recording medium, or any combination of the system, the device, the method, the integrated circuit, the computer program, and the recording medium.

According to the present disclosure, it is possible to provide a security measure method and a security measure system capable of sufficiently securing the safety of traveling of a vehicle even if a virus invades the vehicle.

DESCRIPTION OF EMBODIMENTS

Hereinafter, an embodiment of the present disclosure will be described in detail with reference to the drawings as appropriate. However, more detailed description may be omitted. For example, the detailed description of the already well-known matters and the redundant description of substantially the same configuration may be omitted. This is to avoid the following description from being unnecessarily redundant and to facilitate understanding for those skilled in the art. The accompanying drawings and the following description are provided for those skilled in the art to sufficiently understand the present disclosure, and are not intended to limit the subject matter described in the claims.

Embodiment

<System Configuration>

Figure 1:
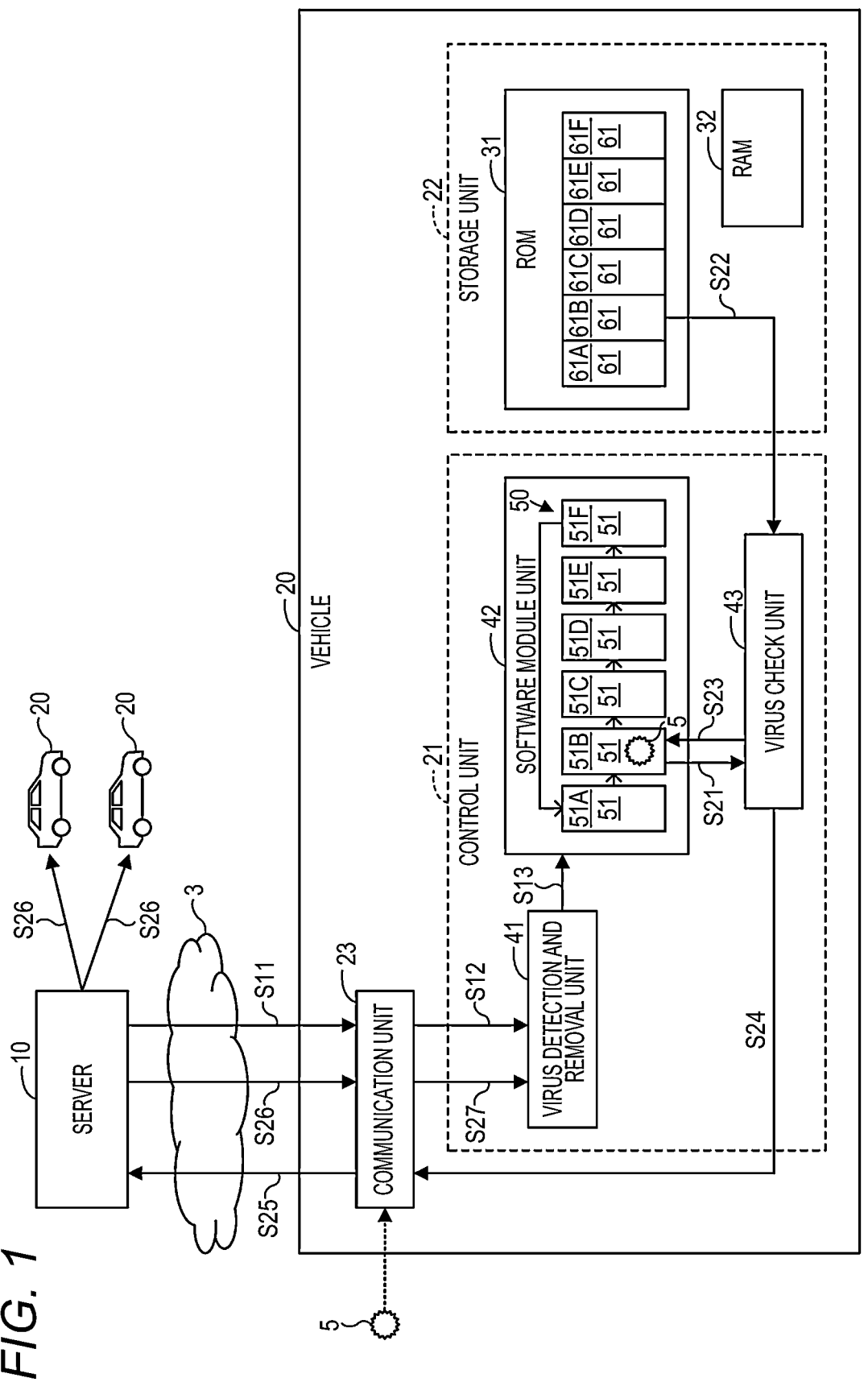
FIG. 1 is a block diagram showing a configuration example of a security measure system according to the present embodiment.

FIG. 1 is a block diagram showing a configuration example of a security measure system 1 according to the present embodiment.

The security measure system 1 is a system that executes the security measure of software 50 executed by a vehicle 20. As shown in FIG. 1, the security measure system 1 includes a server 10 and the vehicle 20. The server 10 and the vehicle 20 can transmit and receive information to and from each other via a communication network 3. Examples of the communication network 3 include a cellular network (long term evolution (LTE), 4G, 5G, and the like), Wi-Fi (registered trademark), and the Internet.

The vehicle 20 includes a control unit 21, a storage unit 22, and a communication unit 23. The control unit 21, the storage unit 22, and the communication unit 23 may be mounted on the vehicle 20 as an electronic control unit (ECU).

The control unit 21 executes the software 50 for achieving the function of the vehicle 20. The software 50 may be read as a computer program. The control unit 21 may be read as another term such as a processor, a central processing unit (CPU), a controller, and a large scale integrated circuit (LSI). The function achieved by the control unit 21 will be described in detail later.

The storage unit 22 stores the software 50 and the data that are executed by the control unit 21. The storage unit 22 may include a read only memory (ROM) 31 and a random access memory (RAM) 32. The ROM 31 is implemented by a non-volatile storage medium. The RAM 32 is implemented by a volatile storage medium. Alternatively, the RAM 32 may be implemented by a non-volatile storage medium.

The communication unit 23 controls wireless communication through the communication network 3. For example, the communication unit 23 transmits and receives information based on a radio signal.

The control unit 21 includes a virus detection and removal unit 41, a software module unit 42, and a virus check unit 43 as functions. In the following description, the processing mainly executed by the virus detection and removal unit 41, the software module unit 42, or the virus check unit 43 can be read as the processing mainly executed by the control unit 21.

The virus detection and removal unit 41 executes virus detection on the software 50 and the data that are received via the communication unit 23. For example, the virus detection and removal unit 41 detects a virus 5 by comparing the virus 5 with the stored virus pattern. When detecting the virus 5, the virus detection and removal unit 41 removes the detected virus 5. The virus pattern may be read as another term such as a virus definition file or a vaccine.

The software module unit 42 executes the software 50 implemented by a plurality of modules. The software 50 may execute, for example, driving assistance control or autonomous driving control of the vehicle 20. Hereinafter, the modules constituting the software 50 executed by the software module unit 42 are referred to as a first module 51. In the present embodiment, as shown in FIG. 1, the software 50 will be described as being implemented by first modules 51A to 51F. In this case, the software module unit 42 may achieve the function provided by the software 50 by repeatedly executing the processing of processing the first module 51A, the first module 51B, . . . , the first module 51F in sequence, and then returning to the processing of the first module 51A.

The virus check unit 43 checks whether there is an abnormality in the first modules 51 that constitute the software 50. For example, the virus check unit 43 may check whether the first modules 51 may be infected with a virus. Details of the processing executed by the virus check unit 43 will be described later.

In the ROM 31, second modules 61A to 61F corresponding to the first modules 51A to 51F constituting the software 50 are stored in advance. The second modules 61A to 61F may be the same as the first modules 51A to 51F. Alternatively, the second modules 61A to 61F may be older versions than the first modules 51A to 51F but may achieve the same functions as the first modules 51A to 51F. The second modules 61A to 61F in the ROM 31 may not be rewritable. Accordingly, the second modules 61A to 61F cannot be rewritten by a cyber attack from the outside. In the present embodiment, when the second modules 61A to 61F are not distinguished, the second modules 61A to 61F are expressed as the second module 61.

The server 10 analyzes a novel virus, generates and updates a virus pattern, and distributes the virus pattern to the vehicles 20. The number of the servers 10 may be one or plural. The server 10 may be read as a so-called cloud service that provides various services to the vehicle 20 via the communication network 3.

Next, a security measure method executed by the security measure system 1 according to the present embodiment will be described in detail with reference to FIG. 1.

First, the processing of distributing the software 50 to the vehicles 20 will be described.

The server 10 distributes the software 50 to the vehicles 20 through the communication network 3 (S11).

The communication unit 23 of the vehicle 20 receives the software 50 in step S11 and provides the software 50 to the virus detection and removal unit 41 (S12).

The virus detection and removal unit 41 executes virus detection on the software 50 provided in step S12 using the currently stored virus pattern. When the virus is not detected, the virus detection and removal unit 41 provides the software 50 to the software module unit 42 (S13).

Next, the processing of checking whether there is an abnormality in the software 50 by the virus check unit 43 of the vehicle 20 will be described.

The virus check unit 43 checks whether there is an abnormality in the first modules 51A to 51F that constitute the software 50 executed by the software module unit 42. For example, as shown in FIG. 1, it is assumed that the virus 5 is the novel virus 5 not registered in the virus pattern, is not detected by the virus detection and removal unit 41, and invades the first module 51B. In this case, the virus check unit 43 determines that there is an abnormality in the first module 51B as a result of the check, and executes the following processing.

The virus check unit 43 extracts the first module 51B from the software 50 (S21).

The virus check unit 43 acquires the second module 61B corresponding to the first module 51B from the ROM 31 (S22).

The virus check unit 43 rewrites the first module 51B in the software 50 to the second module 61B acquired in step S22 (S23). Accordingly, it is possible to quickly rewrite the first module 51B having an abnormality due to the virus infection into the normal second module 61B, for example. For example, by rewriting the first module 51B into the second module 61B before the first module 51B is executed, the normal second module 61B is executed instead of executing the first module 51B infected with the virus. Therefore, the safety of traveling of the vehicle 20 can be sufficiently secured.

The virus check unit 43 transmits the first module 51B extracted in step S21 to the server 10 via the communication unit 23 (S24 and S25).

The server 10 determines whether the received first module 51B is infected with the novel virus 5. When the server 10 determines that the first module 51B is infected with the novel virus 5, the server 10 updates the virus pattern so as to cope with the novel virus 5. The server 10 distributes the updated virus pattern to the vehicles 20 through the communication network 3 (S26). The server 10 does not need to update the virus pattern when it is determined that the abnormality of the first module 51B is, for example, simply breakage of data and not caused by the infection with the novel virus 5.

The communication unit 23 of the vehicle 20 receives the virus pattern distributed in step S26, and provides the virus pattern to the virus detection and removal unit 41 (S27). The virus detection and removal unit 41 can detect and remove the same novel virus 5 in the future by updating the stored virus pattern to the provided virus pattern. That is, the virus detection and removal unit 41 prevents the same novel virus 5 from invading the software module unit 42 next time. Since the updated virus pattern is also distributed to other vehicles 20, the other vehicles 20 also prevent the same novel virus 5 from invading the software module unit 42 next time. That is, according to the present embodiment, when one vehicle 20 is infected with the novel virus 5, the virus pattern capable of detecting the novel virus 5 can also be quickly distributed to the other vehicles 20. Accordingly, it is possible to prevent the spread of the infection of the novel virus 5.

<Processing Executed by Virus Check Unit>

Figure 2:
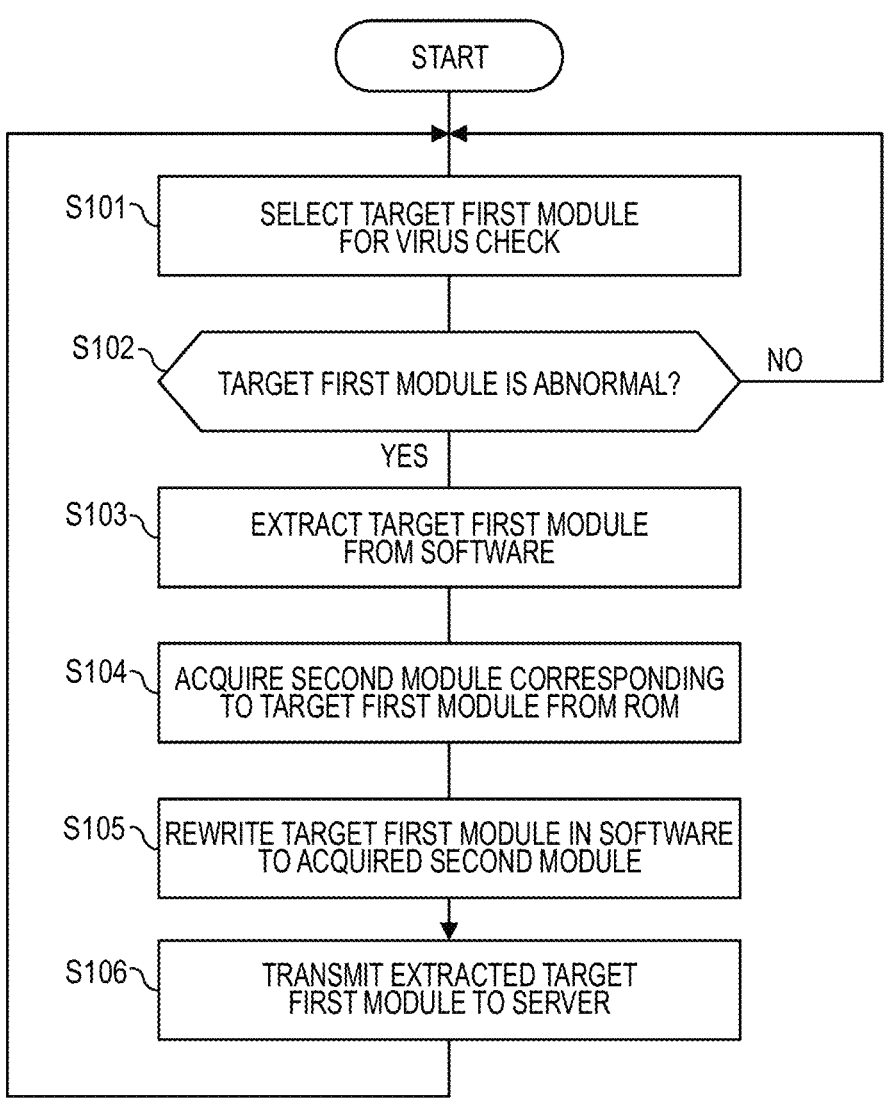
FIG. 2 is a flowchart showing an example of processing executed by a virus check unit of a vehicle according to the present embodiment.

FIG. 2 is a flowchart showing an example of processing executed by the virus check unit 43 of the vehicle 20 according to the present embodiment.

The virus check unit 43 selects one of the plurality of first modules 51 that constitute the software 50 as a target for the virus check (S101). In the description of FIG. 2, the selected first module 51 is referred to as a target first module 51. For example, the virus check unit 43 sequentially selects the first modules 51A to 51F shown in FIG. 1 as the target first module 51. After the first module 51F is selected, the virus check unit 43 may select the first module 51A as the target first module 51.

The virus check unit 43 determines whether or not the target first module 51 is abnormal (S102). For example, when the output value from the target first module 51 is within the normal range, the virus check unit 43 outputs a bit "1" indicating that the target first module 51 is normal, and when the output value from the target first module 51 is out of the normal range, the virus check unit 43 outputs a bit "0" indicating that the target first module 51 is abnormal. For example, the virus check unit 43 outputs the bit "1" indicating that the target first module 51 is normal when the hash value of the target first module 51 matches the hash value calculated in advance in the normal state (that is, when there is no trace of rewriting), and outputs the bit "0" indicating that the target first module 51 is abnormal when the hash value of the target first module 51 does not match the hash value calculated in advance in the normal state (that is, when there is a trace of rewriting). The bits "1" and "0" may be reversed.

When the target first module 51 is normal (that is, when the output in step S102 is the bit "1") (S102: NO), the virus check unit 43 returns the processing to S101.

When the target first module 51 is abnormal (that is, when the output in step S102 is the bit "0") (S102: YES), the virus check unit 43 extracts the target first module 51 from the software 50 (S103). After extracting the target first module 51, the virus check unit 43 may immediately delete the target first module 51 from the software 50.

The virus check unit 43 acquires the second module 61 corresponding to the target first module 51 from the ROM 31 (S104).

The virus check unit 43 rewrites the target first module 51 in the software 50 to the second module 61 acquired in step S104 (S105). For example, the virus check unit 43 deletes the first module 51B from the software 50 and writes the second module 61B instead.

The virus check unit 43 transmits the target first module 51 extracted in step S103 to the server 10 (S106), and returns the processing to step S101.

According to the above processing, the vehicle 20 can quickly rewrite (replace) the abnormal (for example, infected with a virus) first module 51 with the corresponding normal (for example, not infected with a virus) second module 61. The vehicle 20 can transmit the first module 51 that is likely to be infected with a virus to the server 10. Accordingly, as described above, the server 10 can create and distribute a virus pattern capable of detecting a novel virus.

<Structure of Software>

Figures 3A, 3B:
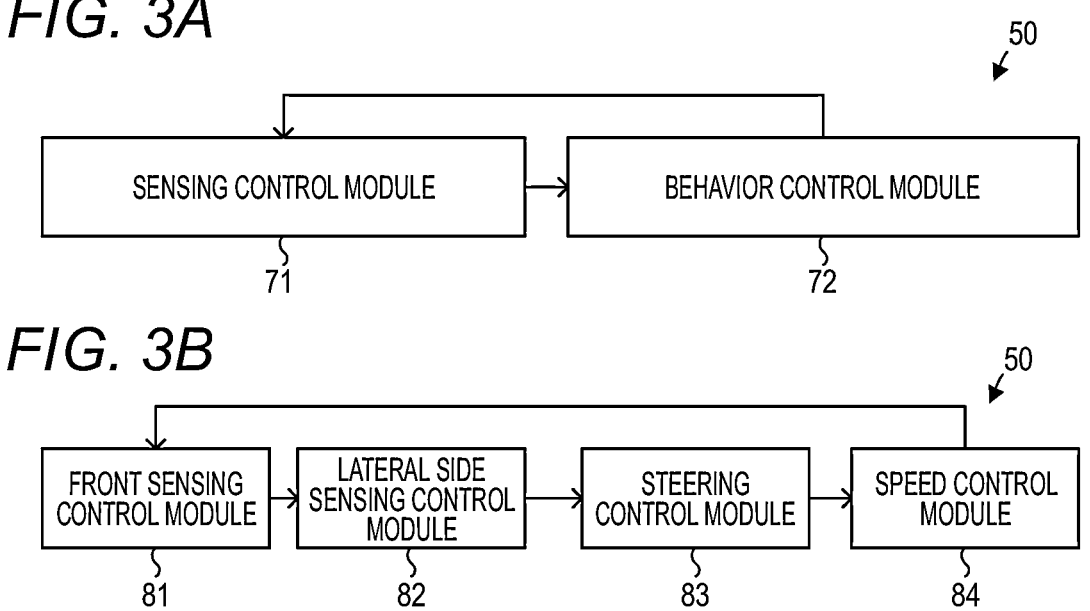
FIGS. 3A and 3B are diagrams showing an example of the structure of software according to the present embodiment.

FIGS. 3A and 3B are diagrams showing the structure of the software 50 according to the present embodiment.

In general, the designer of the software 50 constructs the software 50 with a smaller number of modules from the viewpoint of reducing the data size and increasing the processing speed. However, in the present embodiment, the software 50 is intentionally constructed by a larger number of modules. The module may be read as another term such as a process or a thread.

For example, as shown in FIG. 3A, the software 50 related to the autonomous driving control generally includes a sensing control module 71 that controls sensing of the situation around the vehicle 20 by a sensor (for example, a light detection and ranging (LiDAR) or a camera) mounted on the vehicle 20, and a behavior control module 72 that controls the behavior of the vehicle 20 based on the output result from the sensing control module 71.

On the other hand, in the present embodiment, as shown in FIG. 3B, the function corresponding to the sensing control module 71 is intentionally divided into a front sensing control module 81 that controls sensing of the situation in front of the vehicle 20 using a sensor mounted on the front of the vehicle 20, and a lateral side sensing control module 82 that controls sensing of the situation of the lateral side of the vehicle 20 using a sensor mounted on the lateral side of the vehicle 20. Further, the function corresponding to the behavior control module 72 is intentionally divided into a steering control module 83 that controls steering of the vehicle 20 based on the output results from the front sensing control module 81 and the lateral side sensing control module 82, and a speed control module 84 that controls the speed of the vehicle 20 based on the output results from the front sensing control module 81 and the lateral side sensing control module 82 and the output result from the steering control module 83.

Accordingly, even if the lateral side sensing control module 82 is infected with a virus, the influence on the front sensing control module 81 is prevented. That is, as shown in the present embodiment, by intentionally constructing the software 50 with a larger number of modules, even if one module is infected with a virus, the influence range can be kept to the minimum.

In addition, as shown in the present embodiment, by intentionally constructing the software 50 with a larger number of modules, the probability is reduced that the first module 51 is being executed when the first module 51 is rewritten as shown in S103 to S105 in FIG. 2. Therefore, the probability is increased that even if one first module 51 is infected with a virus, the one first module 51 infected with a virus is replaced with the corresponding second module 61 in the ROM 31 before being executed. That is, the probability is reduced that the first module 51 infected with a virus is executed, and the safety of traveling of the vehicle 20 can be sufficiently secured.

SUMMARY OF PRESENT DISCLOSURE

The content of the present disclosure can be expressed as follows.

APPENDIX 1

In a security measure method for software (50) executed by a vehicle (20), the software is implemented by a plurality of first modules (51). The vehicle includes a ROM (31) configured to store a plurality of second modules (61) corresponding to the plurality of first modules. The vehicle checks whether there is an abnormality in each of the plurality of first modules, extracts, when an abnormal first module is detected, the abnormal first module from the software, reads the second module corresponding to the abnormal first module from the ROM, and rewrites the abnormal first module in the software to the second module read from the ROM.

Accordingly, for example, the abnormal first module that may be infected with a virus can be rewritten to a normal second module in the ROM. Therefore, it is possible to sufficiently secure the safety of traveling of the vehicle.

APPENDIX 2

In the security measure method described in Appendix 1, the vehicle transmits the abnormal first module to a predetermined server (10). The server may execute a virus analysis on the abnormal first module, and may generate, when a virus (5) is detected, a virus pattern for detecting the virus.

Accordingly, when the abnormality in the first module is caused by infection of a novel virus, the server can quickly generate a virus pattern capable of detecting the novel virus.

APPENDIX 3

In the security measure method described in Appendix 2, the server distributes the generated virus pattern to the vehicles, and the vehicles execute virus detection on newly received software using the virus pattern distributed from the server.

Accordingly, when one vehicle is infected with a novel virus, it is possible to quickly distribute a virus pattern capable of detecting the novel virus to other vehicles. Therefore, it is possible to prevent the spread of the infection of the novel virus 5.

APPENDIX 4

A security measure system (1) for taking a security measure on software (50) executed by a vehicle (20) includes a server (10) and the vehicle. The software (50) is implemented by a plurality of first modules (51). The vehicle includes a ROM (31) configured to store a plurality of second modules (61) corresponding to the plurality of first modules. The vehicle checks whether there is an abnormality in each of the plurality of first modules, extracts, when an abnormal first module is detected, the abnormal first module from the software, reads the second module corresponding to the abnormal first module from the ROM, and rewrites the abnormal first module in the software to the second module read from the ROM.

Accordingly, for example, the abnormal first module that may be infected with a virus can be rewritten to a normal second module in the ROM. Therefore, it is possible to sufficiently secure the safety of traveling of the vehicle.

APPENDIX 5

In the security measure system described in Appendix 4, the vehicle transmits the abnormal first module to the server. The server executes a virus analysis on the abnormal first module, and generates, when a virus (5) is detected, a virus pattern for detecting the virus.

Accordingly, when the abnormality in the first module is caused by infection of a novel virus, the server can quickly generate a virus pattern capable of detecting the novel virus.

APPENDIX 6

In the security measure system according to Appendix 5, the server transmits the generated virus pattern to the vehicles. The vehicles execute virus detection on newly received software using the virus pattern received from the server.

Accordingly, when one vehicle is infected with a novel virus, it is possible to quickly distribute a virus pattern capable of detecting the novel virus to other vehicles. Therefore, it is possible to prevent the spread of the infection of the novel virus 5.

Although the embodiment has been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiment described above may be combined freely in a range without departing from the gist of the invention.

The present application is based on Japanese Patent Application No. 2021-205291 filed on Dec. 17, 2021, and the contents thereof are incorporated herein by reference.

INDUSTRIAL APPLICABILITY

The technology of the present disclosure is useful for a security measure for software.

CROSS-REFERENCE TO RELATED APPLICATIONS

This is a continuation of International Application No. PCT/JP2022/029536 filed on Aug. 1, 2022, and claims priority from Japanese Patent Application No. 2021-205291 filed on Dec. 17, 2021, the entire contents of which are incorporated herein by reference.

What is claimed is:

1. A security measure method for software to control a vehicle, the software including first modules, each of the first modules being distinct from others of the first modules, the vehicle including a read only memory (ROM) storing second modules, each of the second modules corresponding to each of the first modules respectively, the security measure method comprising:

checking for presence of each of abnormalities in each of the first modules;

extracting, when first one of the abnormalities is present in first one of the first modules, the first one of the first modules from the software;

reading first one of the second modules from the ROM, the first one of the second modules corresponding to the first one of the first modules;

rewriting the first one of the first modules in the software to the first one of the second modules; and refraining from rewriting the first one of the first modules in the software when the first one of the abnormalities is not present in the first one of the first modules, wherein at least one of the first modules includes at least one instruction to control the vehicle, and at least one of the second modules includes at least one instruction to control the vehicle.

2. The security measure method according to claim 1, further comprising:

transmitting the first one of the first modules which is extracted from the software when the first one of the abnormalities is present in the first one of the first modules, to a server, wherein the server executes a virus analysis on the first one of the first module received from the vehicle, and generates, when a virus is detected in the first one of the first module, a virus pattern for detecting the virus.

3. The security measure method according to claim 2, wherein the abnormalities are defined as the first abnormalities, wherein the server distributes the virus pattern to the vehicles, and wherein the vehicle checks for presence of each of second abnormalities in the each of the first modules using the virus pattern distributed from the server.

4. The security measure method according to claim 1, further comprising:

extracting, when second one of the abnormalities is present in second one of the first modules, the second one of the first modules from the software;

reading second one of the second modules from the ROM, the second one of the second modules corresponding to the second one of the first modules;

rewriting the second one of the first modules in the software to the second one of the second modules; and refraining from rewriting the second one of the first modules in the software when the second one of the abnormalities is not present in the second one of the first modules.

5. A vehicle comprising:

a first memory stores a software to control the vehicle, the software including first modules, each of the first modules being distinct from others of the first modules;

a second memory being a read only memory (ROM), the second memory storing instructions and second modules, each of the second modules corresponding to each the first modules respectively; and at least one processor to be configured to execute the software, wherein the at least one processor checks for presence of each of abnormalities in the each of the first modules, the at least one processor extracts, when first one of the abnormalities is present in first one of the first modules, the first one of the first modules from the software, the at least one processor reads first one of the second modules from the ROM, the first one of the second modules corresponding to the first one of the first modules, and the at least one processor rewrites the first one of the first modules in the software to the first one of the second modules; and wherein the at least one processor does not rewrite the first one of the first modules in the software when the first one of the abnormalities is not present in the first one of the first modules, at least one of the first modules includes at least one instruction to control the vehicle, and at least one of the second modules includes at least one instruction to control the vehicle.

6. The vehicle according to claim 5, wherein the at least one processor transmits the first one of the first modules which is extracted from the software when the first one of the abnormalities is present in the first one of the first modules, to a server, and wherein the server executes a virus analysis on the first one of the first modules received from the vehicle, and generates, when a virus is detected in the first one of the first modules, a virus pattern for detecting the virus.

7. The vehicle according to claim 5, wherein the abnormalities are defined as the first abnormalities, wherein the server distributes the virus pattern to the vehicle, and wherein the at least one processor checks for presence of each of second abnormalities in the each of the first modules using the virus pattern distributed from the server.

8. The vehicle according to claim 5, wherein the at least one processor extracts, when second one of the abnormalities is present in second one of the first modules, the second one of the first modules from the software;

the at least one processor reads second one of the second modules from the ROM, the second one of the second modules corresponding to the second one of the first modules; and the at least one processor rewrites the second one of the first modules in the software to the second one of the second modules, and wherein the at least one processor does not rewrite the second one of the first modules in the software when the second one of the abnormalities is not present in the second one of the first modules.

* * * * *